United States Patent [19]

Earl

[11] 4,401,077

[45] Aug. 30, 1983

[54] THROTTLE LINKAGE CONTROL

[75] Inventor: Robert W. Earl, Palos Verdes Estates, Calif.

[73] Assignee: The Garrett Corporation, Los Angeles, Calif.

[21] Appl. No.: 385,342

[22] Filed: Jun. 4, 1982

Related U.S. Application Data

[63] Continuation-in-part of Ser. No. 255,088, Apr. 17, 1981, abandoned.

[51] Int. Cl.³ .............................................. F02D 9/00
[52] U.S. Cl. .................................. 123/376; 123/403; 74/479; 74/501 R; 74/675
[58] Field of Search ............... 123/376, 396, 398, 403, 123/197 R; 74/479, 501 R, 675

[56] References Cited

U.S. PATENT DOCUMENTS

| | | | |
|---|---|---|---|
| 1,833,039 | 11/1931 | Purdy | 74/832 |
| 2,454,914 | 11/1948 | DeMarco | 123/376 |
| 2,551,979 | 5/1951 | Sparrow | 123/376 |
| 2,604,756 | 7/1952 | Greenland | 74/516 |
| 2,796,774 | 6/1957 | Peed, Jr. | 74/516 |
| 2,814,957 | 12/1957 | Mitrovich | 74/516 |
| 2,871,657 | 2/1959 | Oates et al. | 74/480 |
| 2,881,632 | 4/1959 | Woodward | 74/479 |
| 2,910,886 | 11/1959 | Polleys | 74/479 |
| 2,935,136 | 5/1960 | Wall et al. | 74/479 |
| 2,957,687 | 10/1960 | Chillson et al. | 123/403 |
| 3,166,272 | 1/1965 | Liddell et al. | 74/479 |
| 3,168,265 | 2/1965 | Pfaff et al. | 74/479 |
| 3,204,885 | 9/1965 | Silfhout | 74/479 |
| 3,279,184 | 10/1966 | Felix et al. | 74/480 |
| 3,399,528 | 9/1968 | Warne | 74/479 |
| 3,451,286 | 6/1969 | Bloom | 74/479 |
| 3,485,222 | 12/1969 | Biermann | 123/376 |
| 3,611,828 | 10/1971 | Maroshick | 74/479 |
| 3,618,419 | 11/1971 | Maroshick | 74/479 |
| 3,641,833 | 2/1972 | Maroshick | 74/479 |
| 3,789,692 | 2/1974 | Farr et al. | 74/480 |
| 3,864,914 | 2/1975 | Timmins | 74/480 |
| 3,897,695 | 8/1975 | Rostad | 74/518 |
| 3,910,133 | 10/1975 | Oestmann | 74/479 |
| 4,088,039 | 5/1978 | Bolang et al. | 74/479 |
| 4,304,202 | 12/1981 | Schofield | 123/376 |

FOREIGN PATENT DOCUMENTS 629639 9/1949 United Kingdom .
781481 8/1957 United Kingdom .

Primary Examiner—William A. Cuchlinski, Jr.
Attorney, Agent, or Firm—Joseph A. Yanny; Leslie S. Miller; Albert J. Miller

[57] ABSTRACT

A differential throttle linkage control for controlling the flow of fuel to an engine receives a main input from the throttle lever, and a second input from a trim actuator motor through a movable portion of a programmed split cam. The throttle control algebraically sums the inputs to produce a single output operably connected to the fuel metering device of the engine. The programmed split cam modifies or neutralizes the effects of the trim input through selected ranges of the throttle lever input stroke.

32 Claims, 18 Drawing Figures

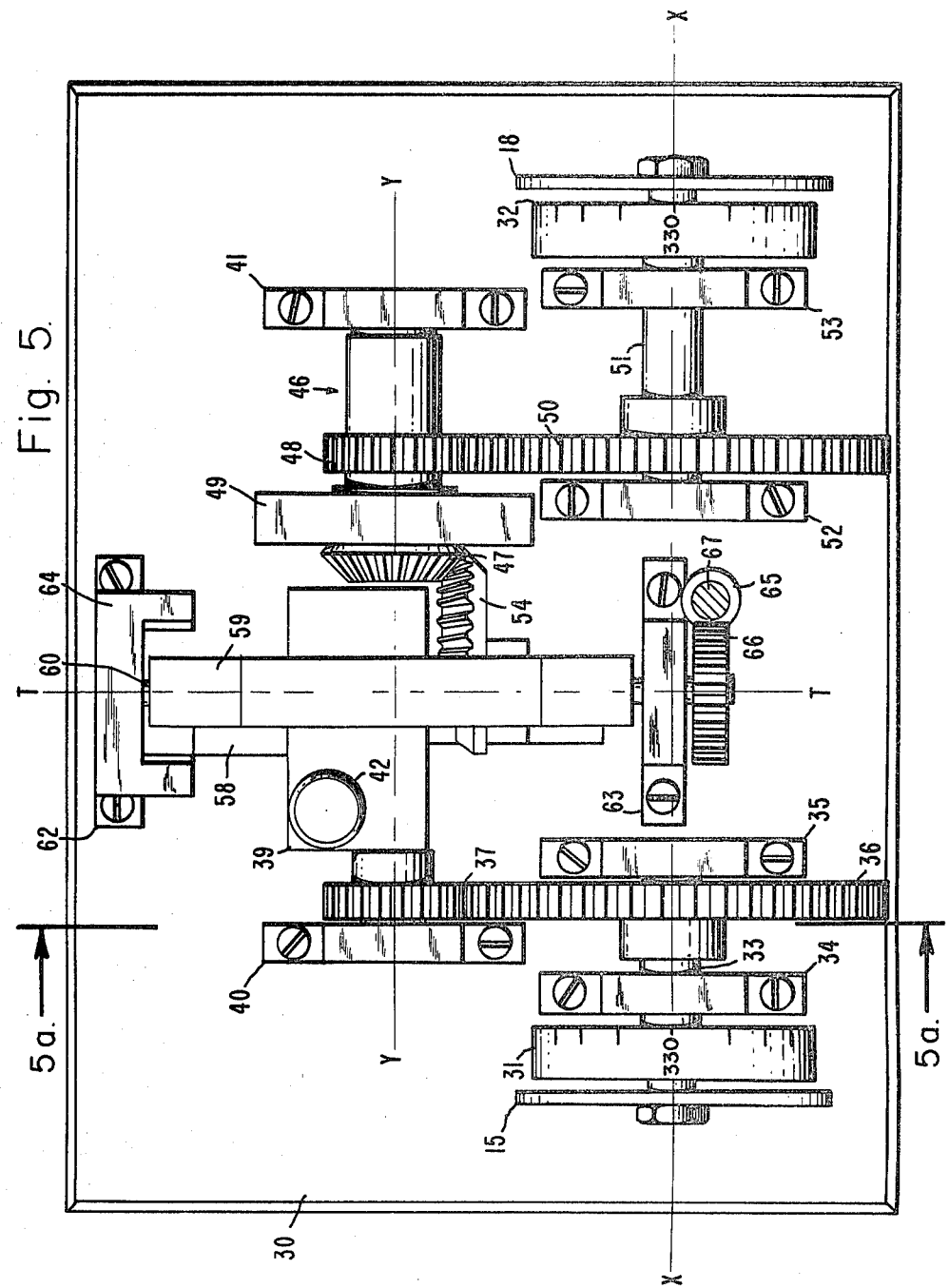

THROTTLE LINKAGE CONTROL

This application is a continuation-in-part of copending U.S. Patent Application, Ser. No. 255,088, filed Apr. 17, 1981, now abandoned in the name of Robert W. Earl.

The invention relates to a differential throttle linkage control which acts to combine a primary mechanical input from a throttle lever, and a secondary mechanical input from a fuel trimming actuator through a split mechanical cam element to produce a single output which is conveyed to a fuel metering device associated with an engine, which cam element modifies or neutralizes the effects of the trim actuator upon output through selected ranges of throttle lever stroke, and more specifically, to a throttle control of the described type for use in aircraft, which throttle linkage control neutralizes the authority of the trim actuator to influence the output and thus the fuel flow rate to the engine, when the throttle lever is in or near critical ranges of its stroke such as idle, full or reverse thrust positions.

A wide variety of devices are used to communicate a desired throttle setting from the throttle quadrant of an aircraft to the fuel metering device associated with the engine. Typically, a direct mechanical or electronic link between the throttle lever and the fuel metering device has been employed to control the amount of fuel which is provided to an engine and thereby provide control based upon speed temperature or other selected engine parameters.

It is desirable to be able to trim, or automatically fine tune the amount of fuel delivered to the engine without direct pilot movement of the throttles and without the use of an autothrottle. This allows the pilot to select an appropriate throttle setting for each flight mode and then turn his attention to other duties while the engine is automatically fine trimmed. Other devices which allow this type of activity have been described in copending U.S. Patent Application Ser. No. 180,224, filed Aug. 21, 1980 for use with a flight management control system of the type described and claimed in International Patent Application PCT Ser. No. 01,065, filed Aug. 21, 1980 entitled "Engine Management System" by Leon Lewis. The present invention is also intended for use with the Lewis "Engine Management System".

In such a system, particular care must be taken to control the engine when the throttle setting is near the upper or lower end of the forward thrust throttle stroke, inasmuch as there is a higher possibility that a trimming system malfunction could cause a loss of maximum thrust or flameout respectively. Additional care must be taken during reverse thrust operations, during aircraft landing to eliminate the possibility of down trim since such an occurrence could cause loss of sufficient braking to stop the aircraft.

In summary, the present invention provides for a differential throttle linkage control which acts as a mechanical input mixer to control the flow of fuel to an engine. The throttle control receives a main input corresponding to the throttle lever position which represents a preferred fuel flow rate command. A second or trimming input is supplied to the mixer from a trim actuator through a split cam to adjust the fuel flow rate to the requirements of the engine without movement of the throttle lever by the pilot or an autothrottle. The split cam is programmed to modify the effects of trim input upon output through selected ranges of throttle lever stroke and neutralizes the effects of the trim input upon output when the throttle lever is in selected critical areas of its stroke such as idle or full forward thrust, or, reverse thrust positions. The throttle control combines the inputs to produce a single output which is mechanically transmitted to a fuel metering device associated with the aircraft engine to control the flow of fuel to the engine. The present invention is designed as a planetary gear system and therefore allows for compact, lightweight, and reliable construction. Additional structural features allow for ease of fabrication and repair.

The advantages of the throttle control of the present invention may be best understood when the following specification is considered in conjunction with the appended drawings wherein:

FIG. 2a is a side elevational view of the device of FIG. 2 taken along line 2a;

FIG. 3a is a side elevational view of the device of FIG. 3 taken along line 3a;

FIG. 4a is a side elevational view of the device of FIG. 4 taken along line 4a;

FIG. 5 is a plan view similar to FIG. 2 with the throttle lever in a reverse thrust position;

FIG. 5a is an elevational view of the device of FIG. 5 taken along line 5a;

DETAILED DESCRIPTION OF THE DRAWINGS

Figure 1:
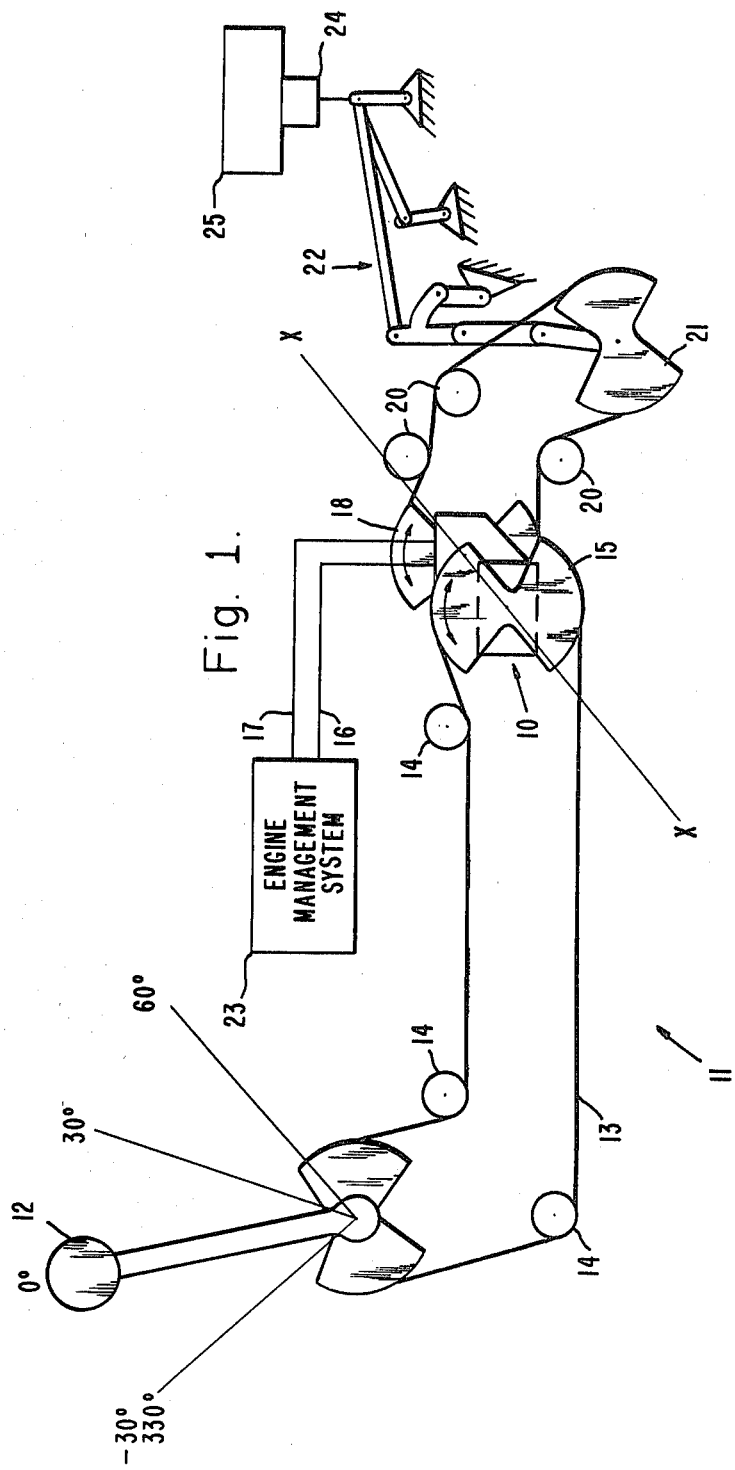
FIG. 1 is a diagrammatic sketch of a system which uses the throttle linkage control of the present invention.

Referring now to FIG. 1, an enclosed differential throttle linkage control 10, according to the present invention, is shown in use with a fuel flow control system 11 of the type typically used in aircraft. For purposes of the present illustration, the 0° position of the throttle lever 12 corresponds to engine idle; 30°, to midstroke for forward thrust; 60°, to full stroke or full forward thrust; and −30°, (or 330°) to midstroke for reverse thrust.

The desired fuel flow rate command is determined by the position of the throttle lever 12, and transmitted to the throttle linkage control 10 through cable 13, idlers 14 and input cable quadrant 15. Input cable quadrant 15 is rotatable about axis X-X and its position relative to its extreme limits of motion, correspond to the relative position of the throttle lever 12 to its extreme limits of motion.

Throttle linkage control 10, also receives an electrical trimming input command from an "Engine Management System" 23 through line 16. The electrical trimming input drives an electric motor (not shown in the drawings) to vary the fuel flow rate command of the throttle lever 12, without movement thereof. The throttle linkage control 10, algebraically sums the two input commands into a single output command. The position of the electric motor, relative to its extreme limits of motion, is read by a position sensor (not shown in the drawings) and transmitted to the "Engine Management System" 23 via a feedback line 17.

The single output command, as will be more fully discussed herein below, drives output cable quadrant 18 to rotate about axis X-X. The output command is transmitted to the fuel metering device 24 of the engine 25 by cable 19, idlers 20, output cable quadrant 21 and lever assembly 22 in a manner well known in the art.

Referring now to FIGS. 2-5, the unhoused planetary gear assembly of the throttle linkage control 10 of the present invention is shown in detail and as mounted upon base member 30. Base member 30, in use, is grounded to the air frame. Graduated input and output dials 31 and 32 respectively, are shown in the drawings to illustrate operation but are not necessary for operation of the actual embodiment.

The throttle linkage control 10, is shown to include throttle input axle 33 mounted for rotation with input cable quadrant 15 and suspended for rotation about axis X-X by supports 34 and 35 and bearings (not shown in the drawings). Input spur gear 36 is rigidly attached to, or integral with, input axle 33 for rotation therewith in response to movement of throttle lever 12.

Input spur gear 36 is in constant toothed engagement with input spur pinion 37 which is rigidly affixed to, or integral with, a portion of a central rotating assembly axle 38 for rotation about axis Y-Y. A planet carrier 39 is also rigidly affixed to axle 38 for rotation about axis Y-Y. Axle 38 is supported for rotation by supports 40 and 41 and bearings (not shown in the drawings). Weight 42 is affixed to planet carrier 39 by a suitable means for balance purposes.

A one piece rotatable mixer assembly 46 which includes beveled sun gear 47 and output spur pinion 48, is supported for independent rotation about axis Y-Y and axle 38 by suitable bearings (not shown in the drawings) and support member 49. Output spur pinion 48 is in constant toothed engagement with output spur gear 50.

Output spur gear 50 is rigidly affixed to, or integral with, output axle 51 for rotation therewith about axis X-X although it should be readily apparent to those skilled in the art that the axis of output axle 51 need not be coincident with axis X-X. Output axle 51 is suitably supported for rotation by bearings (not shown in the drawings) and supports 52 and 53. Output cable quadrant 18, is rigidly affixed to the end of output axle 51 and thereby transmits the output command of the throttle linkage control 10, to the engine 25 as illustrated in FIG. 1.

Beveled sun gear 47, is in constant toothed engagement with planet gear 54. Planet gear 54 is revolved about axis Y-Y by rotation of input spur pinion 37 through movement of throttle lever 12, as more fully described herein below with reference to FIGS. 2A-5A and 6-8. The revolution of planet gear 54 about axis Y-Y translates into rotational movement of sun gear 47, output spur pinion and gear 48 and 50, and thus affects the fuel flow rate to the engine as previously described.

The throttle linkage control 10, also includes a cam assembly 57. A fixed cam portion 58 is affixed to the base 30. A movable cam portion 59 includes protuberances 60 and 61 integral therewith which are journaled for rotation in supports 62 and 63 to allow rotation of movable cam portion 59 about axis T-T. Support 62, includes stop member 64 atop thereof which intersects the path of movable cam portion 59 and thereby limits the movement thereof about axis T-T to approximately 10° to 14° of up or down trim rotation from its centered upright or, neutral, position. It should, however, be noted that the amount of trim may, within practical limits, be extended beyond these parameters.

Movable cam portion 59 is rotated about axis T-T by the interaction of a worm 65 with gear 66 which is rigidly secured to the end of protuberance 61 which extends beyond support 63. The shaft 67 of worm 65 is driven either clockwise or counterclockwise by the electric motor (not shown in the drawings) which receives inputs through lines 16 (FIG. 1) from the "Engine Management System" 23. The bottom of worm shaft 65 is suitably secured to base 30 for rotation.

Figure 5A:
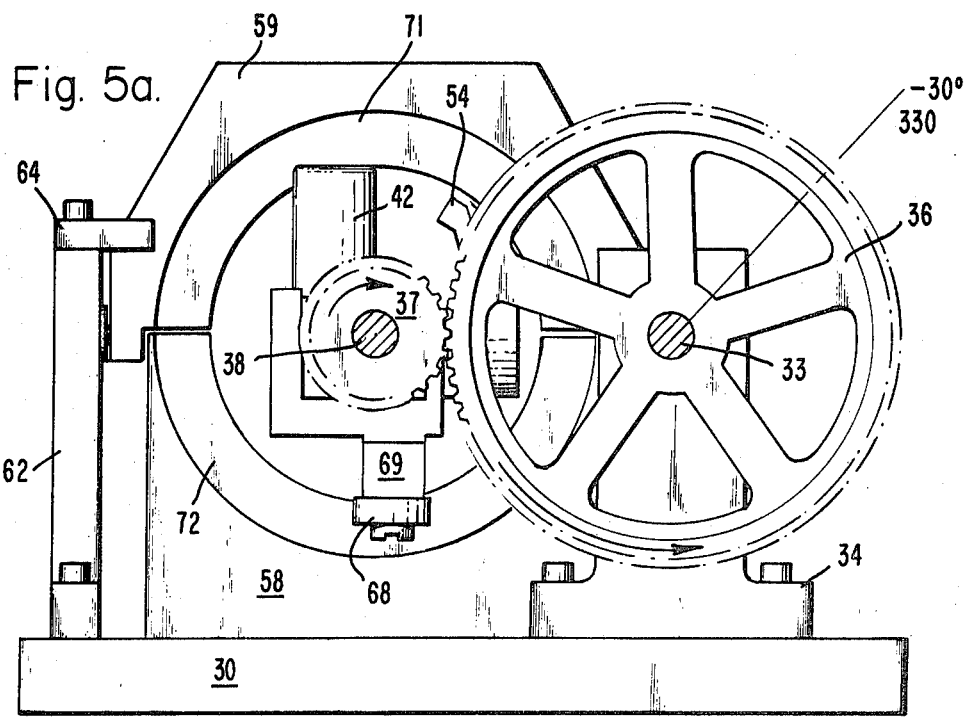
Figure 6:
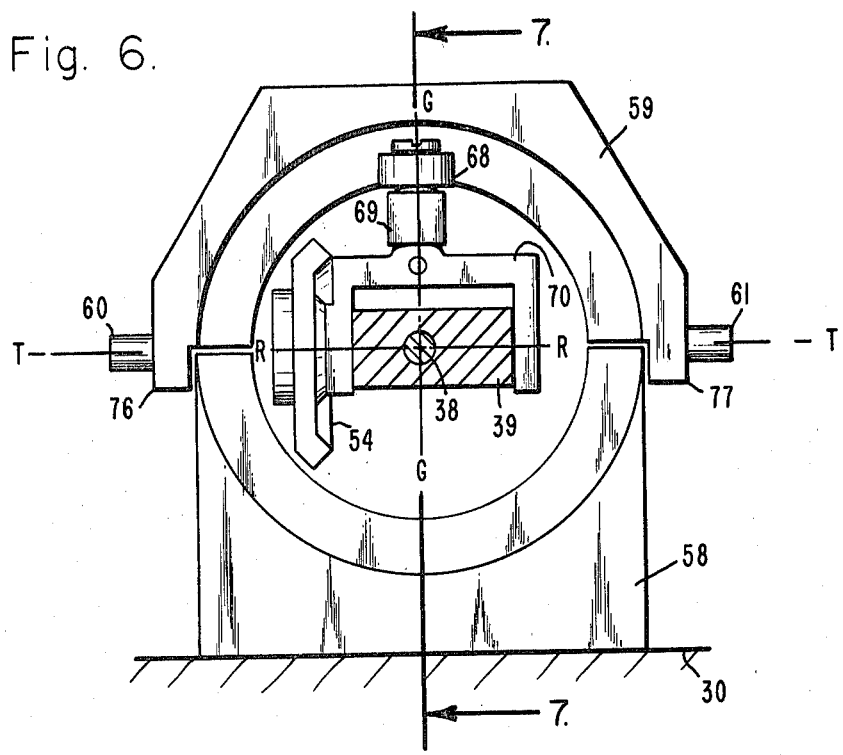
FIGS. 6-8 are detailed elevationals of a central rotating assembly and cam elements of the device of FIG. 2.
Figure 7:
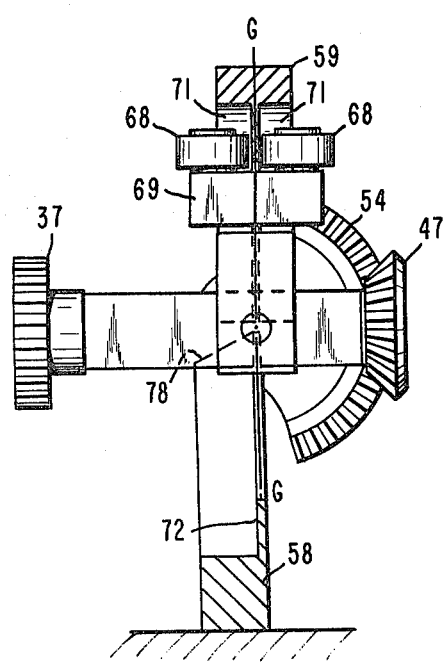
Figure 8:
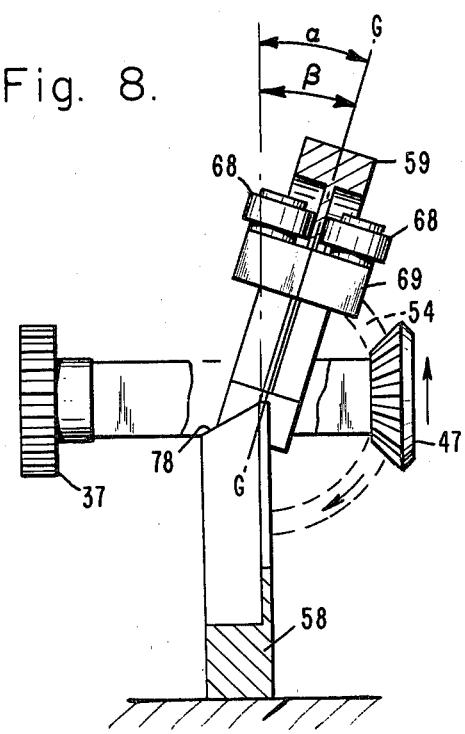

FIGS. 2-5 also show a pair of cam followers 68 mounted upon gimbal block 69, the operation and interrelationship of which is best understood by reference to FIGS. 6-8. As shown in FIG. 6 the throttle linkage control 10, includes a cam follower yoke assembly 70, which is rotatable about axis R-R. Cam follower yoke assembly 70 is mounted for said rotation upon planet carrier 39, so as to be revolvable about axis Y-Y in response to throttle lever 12 inputs. Planet gear 54, is rigidly secured to, or formed integral with, cam follower yoke assembly 70 to be revolvable about axis Y-Y in response to throttle lever 12 inputs at all times, and rotatable about axis R-R in response to trim inputs, when cam followers 68 are in contact with movable cam portion 59. Cam followers 68 are secured to gimbal block 69 which is rotatable about axis G-G to allow cam followers 68 to cross from movable to fixed cam portions 59 and 58 respectively, (and vice versa), without binding. Axis G-G forms a right angle with axis R-R.

Referring now to FIGS. 7 and 8, movable cam portion 59, is shown to include cam follower races 71 in which the cam followers 68 ride. Fixed cam portion 58 is similarly provided with cam follower race 72.

When cam followers 68 are in contact with movable cam portion 59, as shown in FIG. 8 and movable cam portion 59 is rotated about axis T-T by an amount $\partial$, cam followers 68, gimbal block 69, cam follower yoke assembly 70, and planet gear 54, rotate about axis R-R by an amount $\beta$ determined by the relationship between axis T-T and G-G with maximum $\beta$ movement achieved when said axes are perpendicular. This movement results in a gain or loss in the throttle lever commanded fuel flow rate through sun gear 47 without movement of either the throttle lever 12 or input spur pinion 37.

As can best be seen in FIG. 6, movable cam portion 59, is formed to include depending skirt portions 76 and 77. The inside distance between skirt portions 76 and 77, is slightly larger than the outside distance between the ends of fixed cam portion 58. A portion of protuberances 60 and 61 extend from skirt portions 76 and 77 respectively and are journaled for rotation by supports 62 and 63 so that axis T-T divides the space between fixed and movable cam portions 58 and 59. As best seen in FIGS. 7 and 8, axis T-T is aligned near the leading edges of fixed cam 58, and fixed cam 58 is provided with beveled edge 78 to allow for generally interference free limited rotation of movable cam portion 59 about axis T-T.

The operation of the throttle linkage control 10, is best understood by grouping the drawings according to the position of the throttle lever 12. All items previously described herein are identified by the same reference characters throughout.

Figure 2:
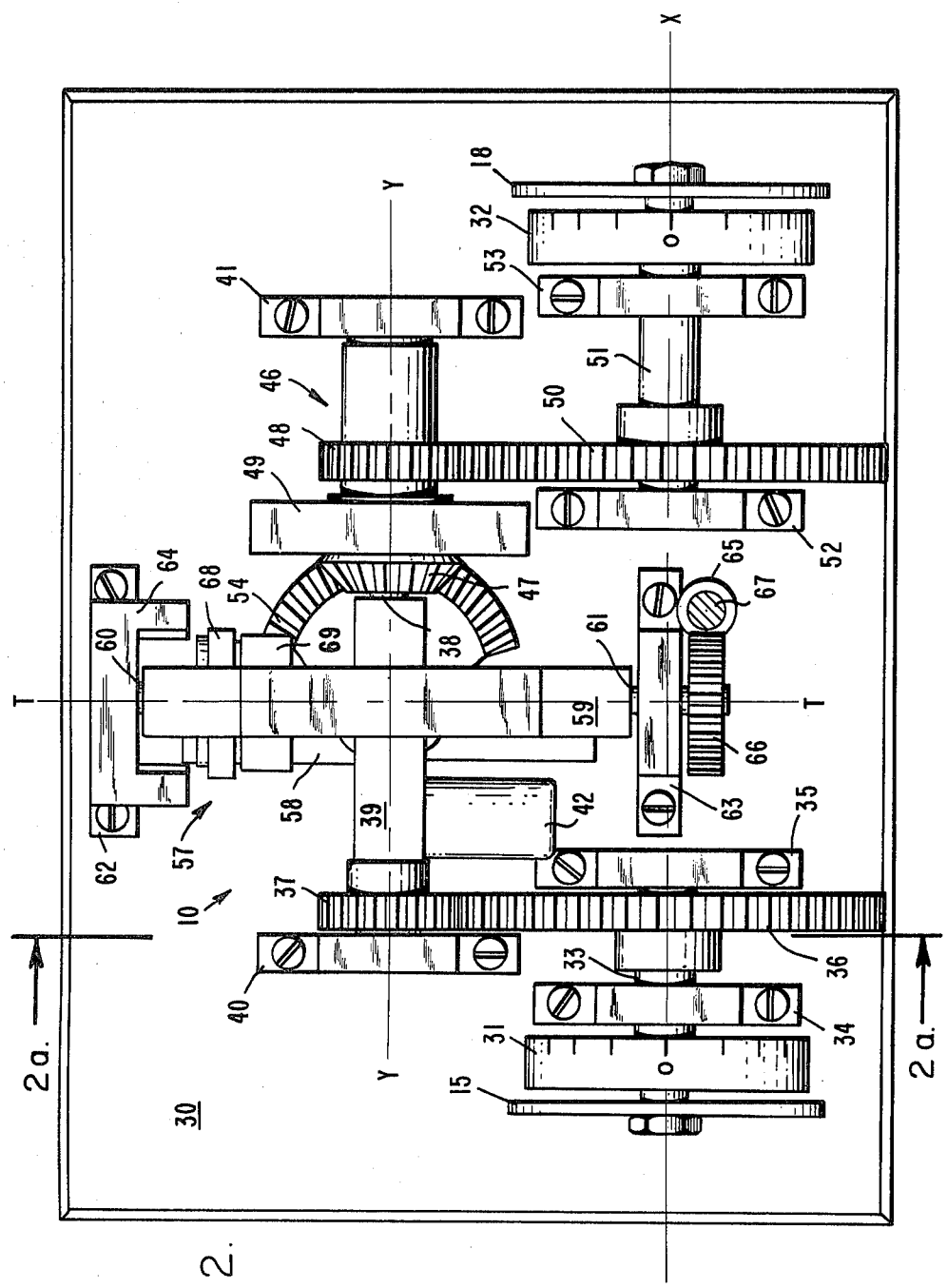
FIG. 2 is a plan view of the planetary gear system of the present invention when the throttle lever is in one position.
Figure 2A:
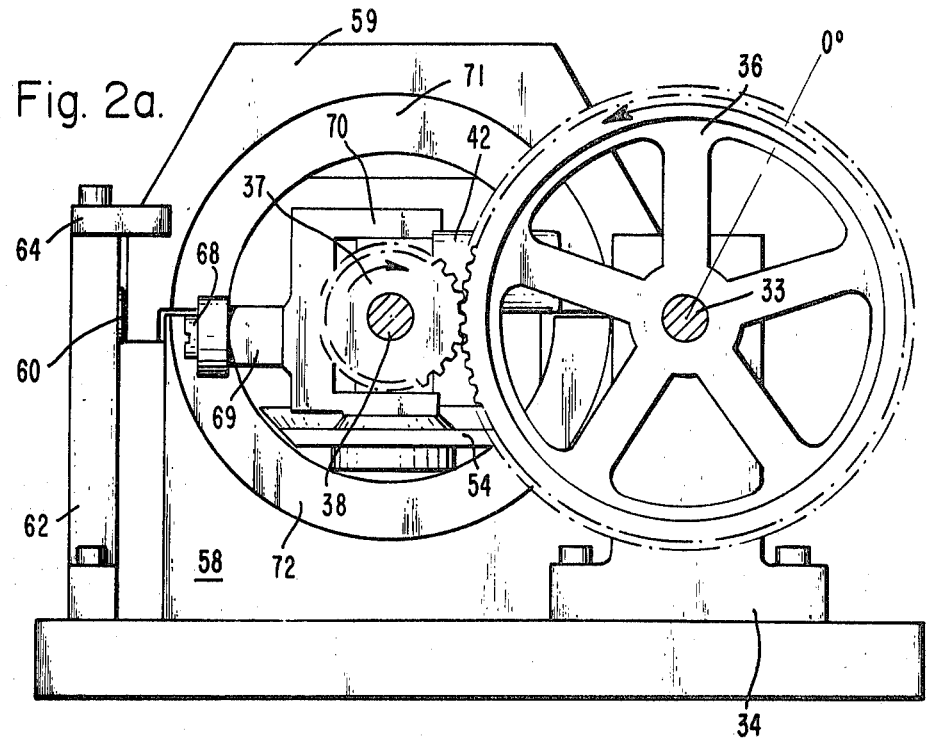
Figure 2B:
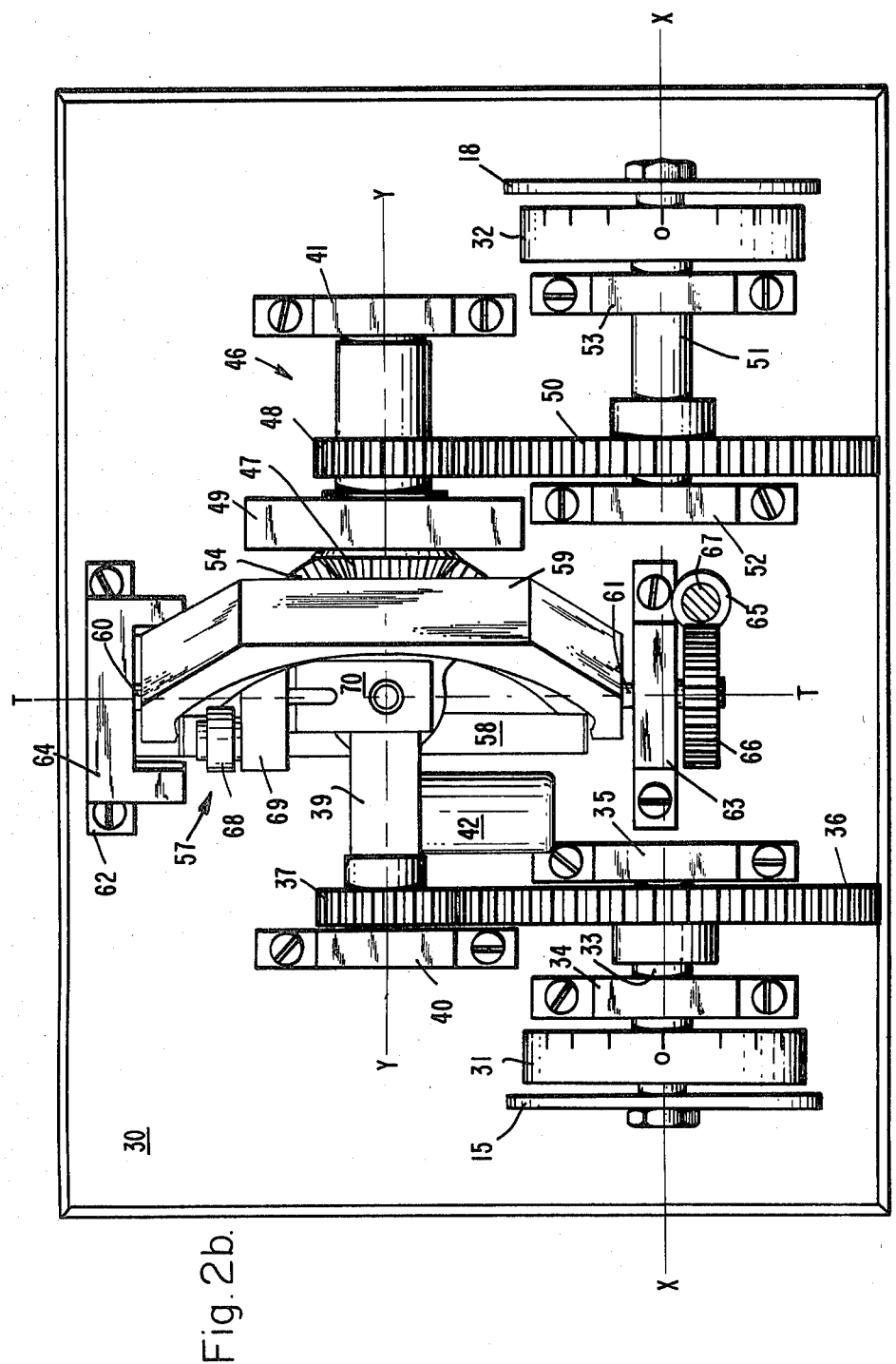
FIG. 2b is a plan view of the device of FIG. 2 with a movable cam in a first mode.

FIGS. 2 and 2a show the control 10 when the throttle lever 12, is in the 0°, or engine idle position and there are no trim inputs, i.e. movable cam portion 59 is in the centered upright position, while FIG. 2b, shows the same throttle lever setting with the movable cam portion 59, in a full downtrim position. As can best be seen in FIG. 2a, cam followers 68, are not in contact with movable cam portion 59, so that rotation of the worm 65, in response to up or down trim commands, which move the movable cam 59 from the centered position as shown in FIG. 2 to, for example, the full down trim position as shown in FIG. 2b, does not alter the output from that commanded from the throttle lever 12 position. This can be visually verified by viewing the input and output dials, 31 and 32, in FIGS. 2 and 2b. The result would be identical for an uptrim command induced opposite rotation of movable cam 59.

Figure 3:
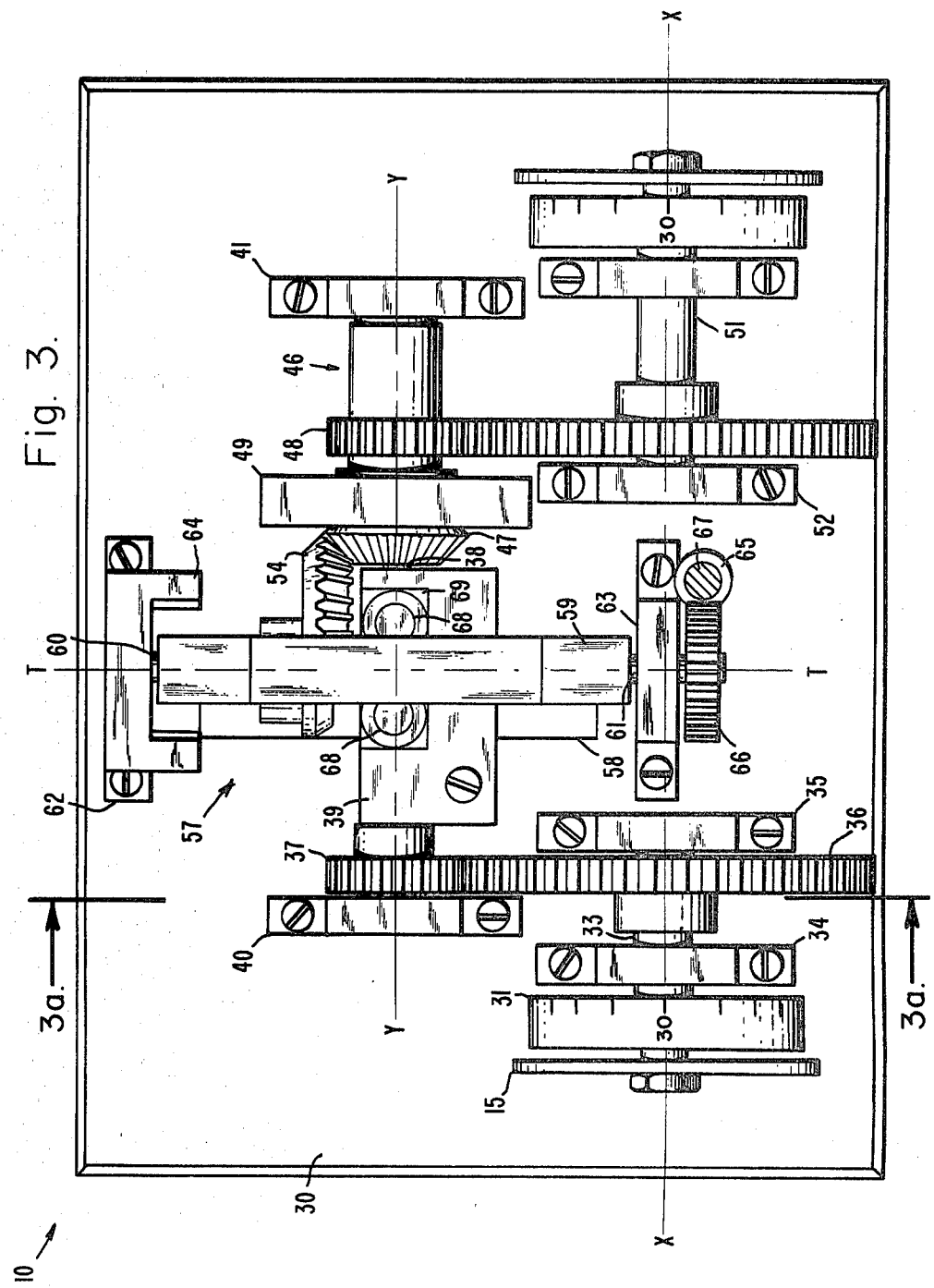
FIG. 3 is a plan view similar to FIG. 2 with the throttle lever in a second position.
Figure 3A:
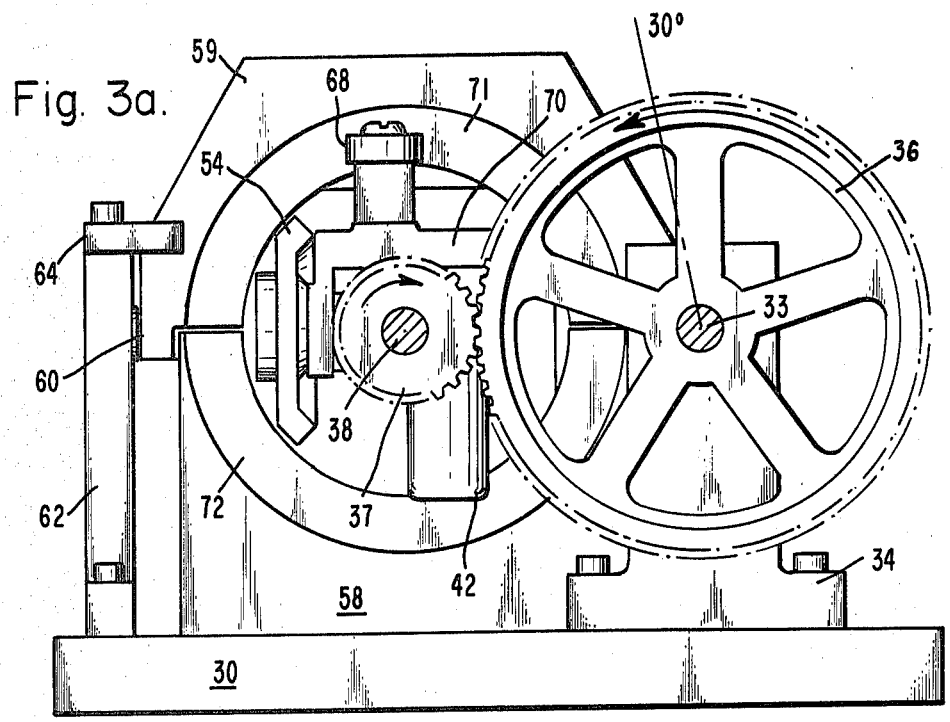
Figure 3B:
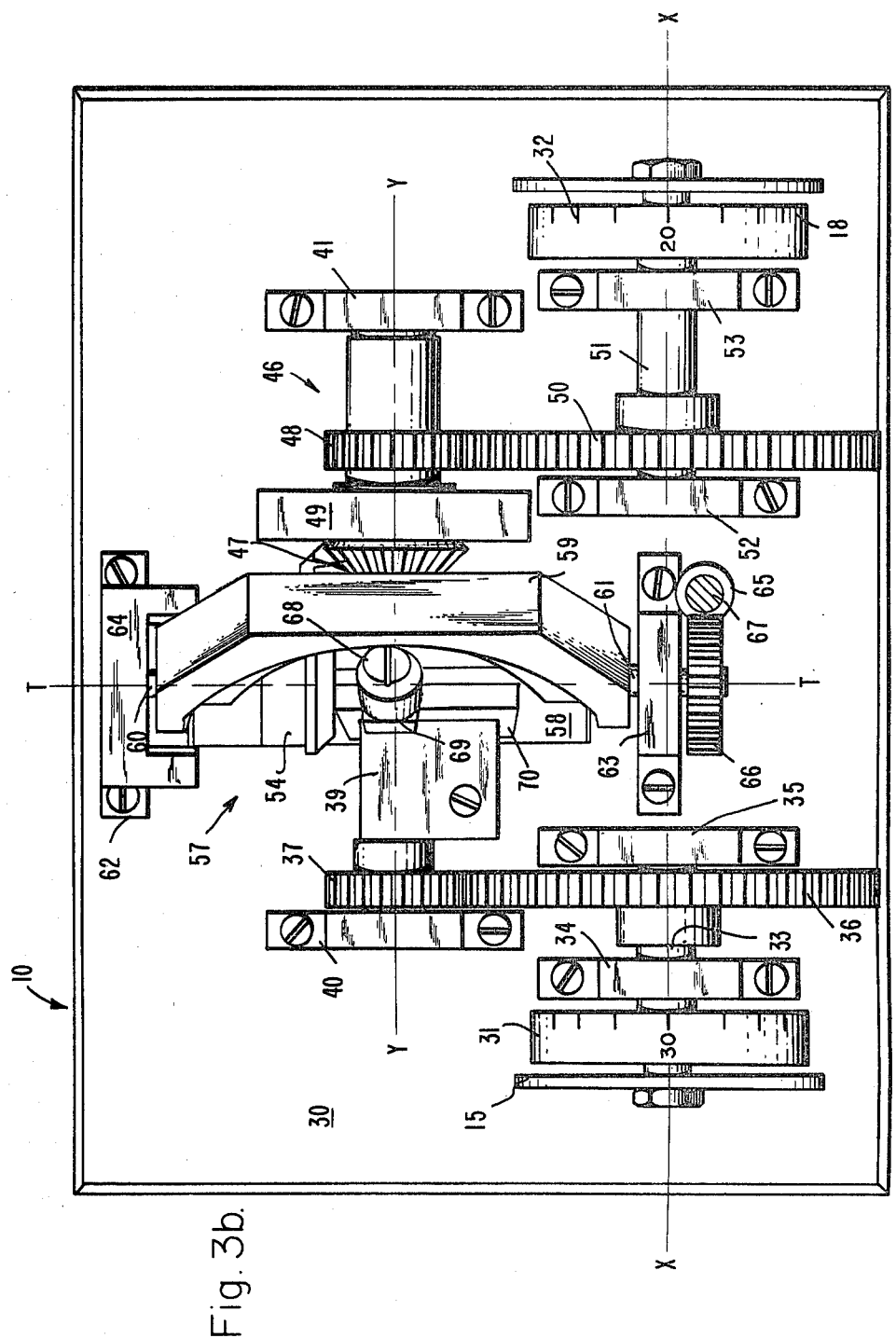
FIG. 3b is a plan view of the device of FIG. 3 when the movable cam is in the first trimming position.

Rotation of the throttle lever 12, from the idle, 0°, position shown in FIG. 2, to the midstroke, 30°, position shown in FIGS. 3 and 3a causes a corresponding rotation of input axle 33, input spur gear 36, input spur pinion 37, planet carrier 39, and cam followers 68. Planet gear 54, is revolved about axis Y-Y, thereby rotating sun gear 47, output spur pinion and gear, 48 and 50, and output axle 51, thereby demanding an increased fuel flow rate, as can be verified by comparing input and output dials 31 and 32 in FIGS. 2 and 3. As best shown in FIG. 3a, this aligns cam followers 68 with the high point of movable cam portion 59 and thus perpendicularly orients axes T-T and G-G. When the cam followers 68, are thus aligned, trim down inputs from the "Engine Management System" cause clockwise rotation of worm 65, and rotation of gear 66 and movable cam portion 59 about axis T-T in the direction shown by arrow A in FIG. 3b. Thus, cam followers 68 are revolved about axis R-R and yoke assembly 70, and planet gear 54, are rotated about axis R-R (FIG. 6) causing rotation of sun gear 47, output spur pinion and gear, 48 and 50, and axle 51, to alter the fuel flow rate command of the throttle lever 12 setting without movement thereof or its interconnected drive train members, i.e. input gear and pinion, 36 and 37, or axle 38. As FIG. 3b clearly illustrates, the throttle lever is set at 30° i.e. midstroke forward thrust, but after the downtrim input rotation of movable cam portion 59, as described, the output command to the engine through axle 51 is for 20° i.e. one third full forward thrust.

Figure 3C:
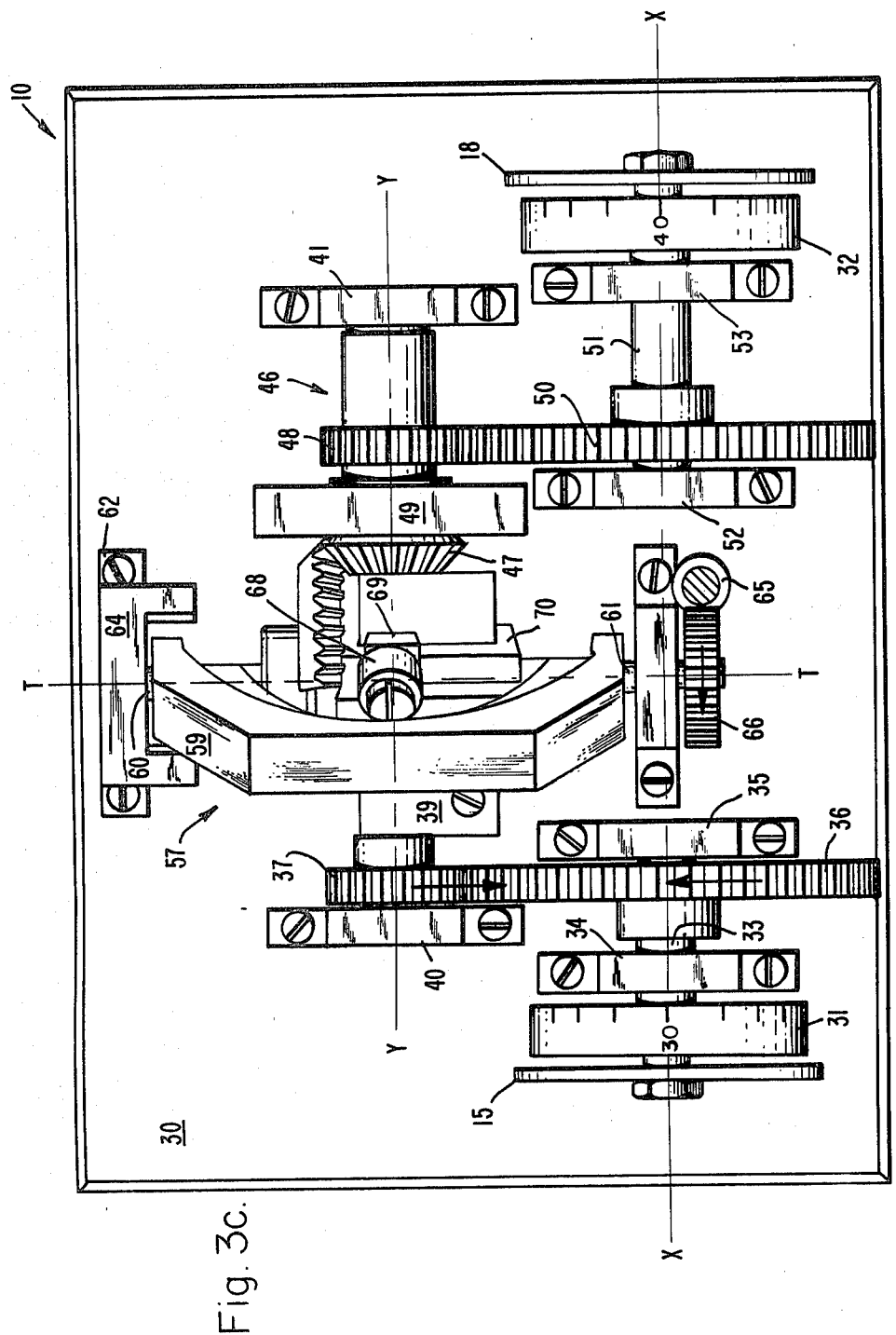
FIG. 3c is a plan view of the device of FIG. 3 when the movable cam is in the second trimming position.

Up trim of the system 10, with throttle lever 12 at midstroke forward thrust is depicted in FIG. 3c, and is accomplished through counterclockwise rotation of worm 65. Gear 66 is rotated in the direction of arrow B and movable cam portion 59, is rotated about axis T-T. Cam followers 68 are revolved about axis R-R and yoke assembly 70, and planet gear 54 are thus rotated about axis R-R (FIG. 6). Through the interaction of sun gear 47 with planet gear 54, the fuel flow rate command is thus uptrimed without movement of the throttle lever 12. Thus, while the input dial 31 in FIG. 3c shows a 30°, halfstroke forward thrust position, output dial 32, shows a fuel flow rate command to the engine of 40°, i.e. two thirds forward thrust.

It should be apparent in light of the above discussion and reference to FIG. 6 that when the throttle lever is in the midstroke forward thrust position, axes G-G and T-T are perpendicular. As previously stated, it is this condition which allows maximum trim induced excursion from the fuel flow rate command of the throttle lever 12 since cam followers 68, then intersect the largest portion of the arcuate path cut by movable cam portion 59, when it moves about axis T-T. However, some degree of excursion is permitted whenever the cam followers are in contact with the movable cam portion 59, and it is not until axis G-G becomes coincident to axis T-T or cam followers 68 are in contact with fixed cam portion 58, that trim induced excursion will not occur.

Figure 4A:
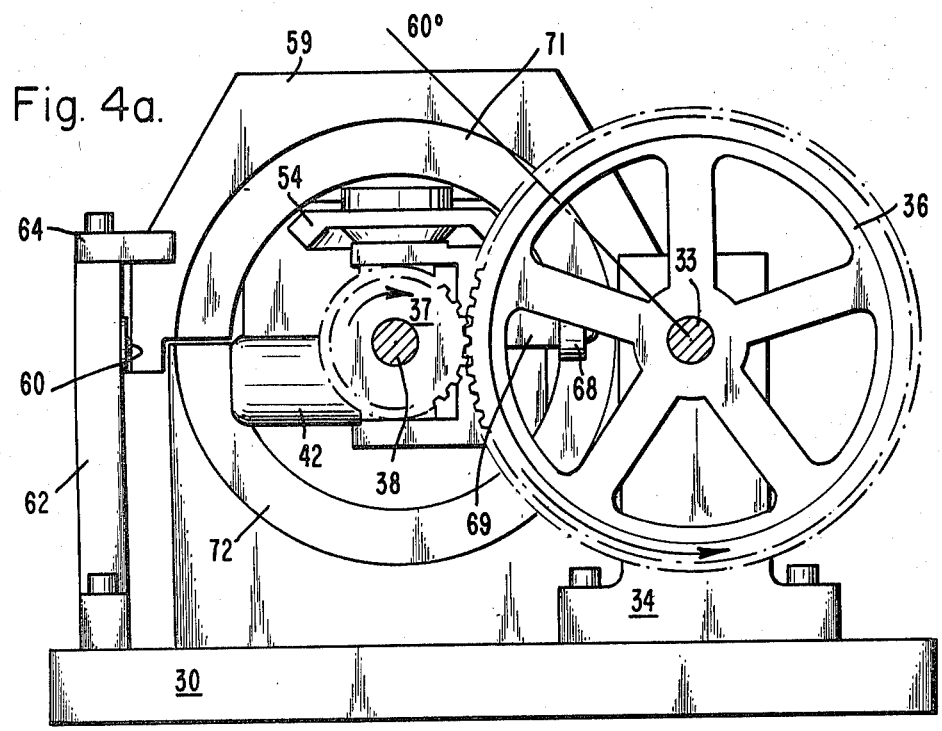
Figure 4:
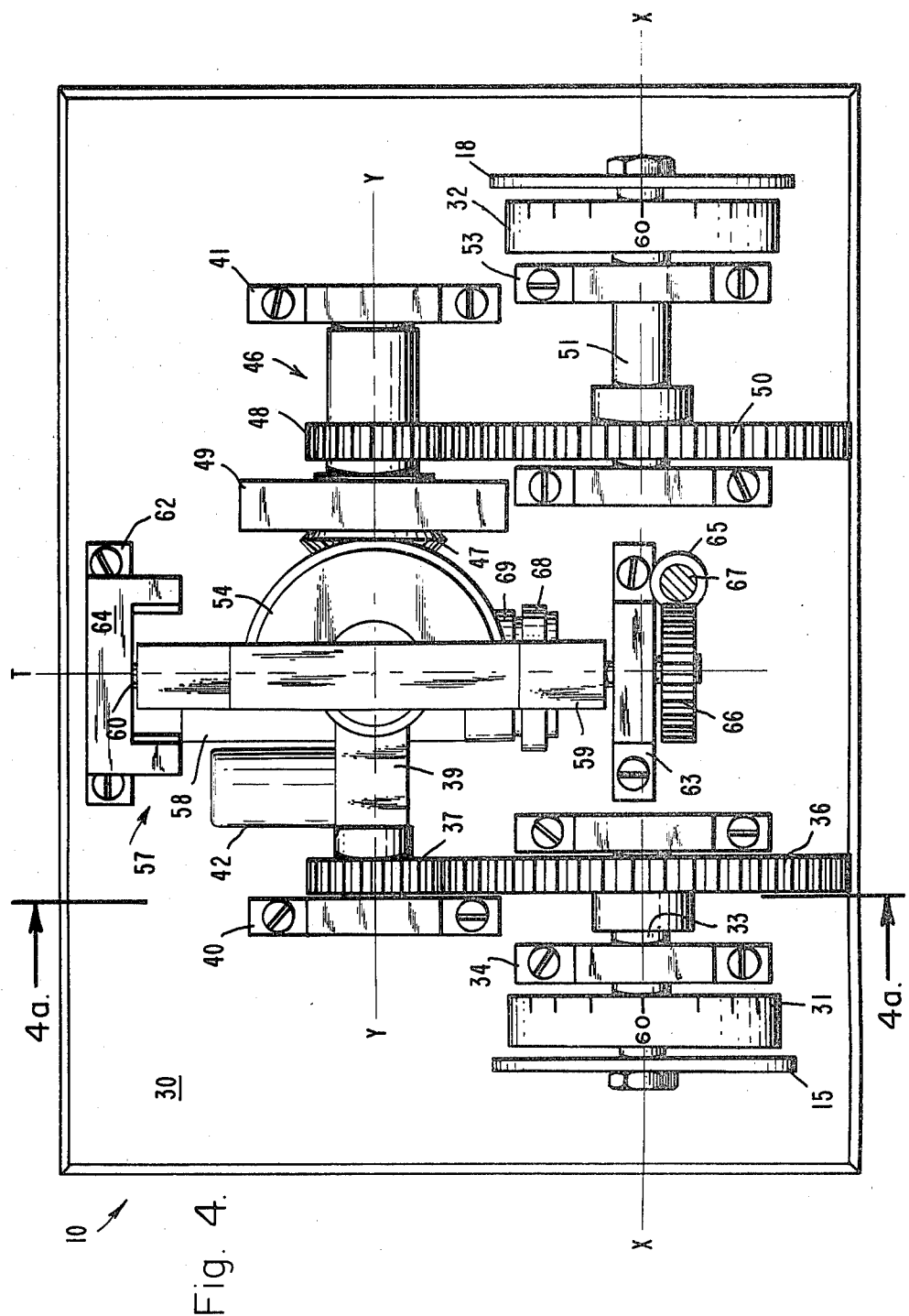
FIG. 4 is a plan view similar to FIG. 2 with the throttle lever in a third position.
Figure 4B:
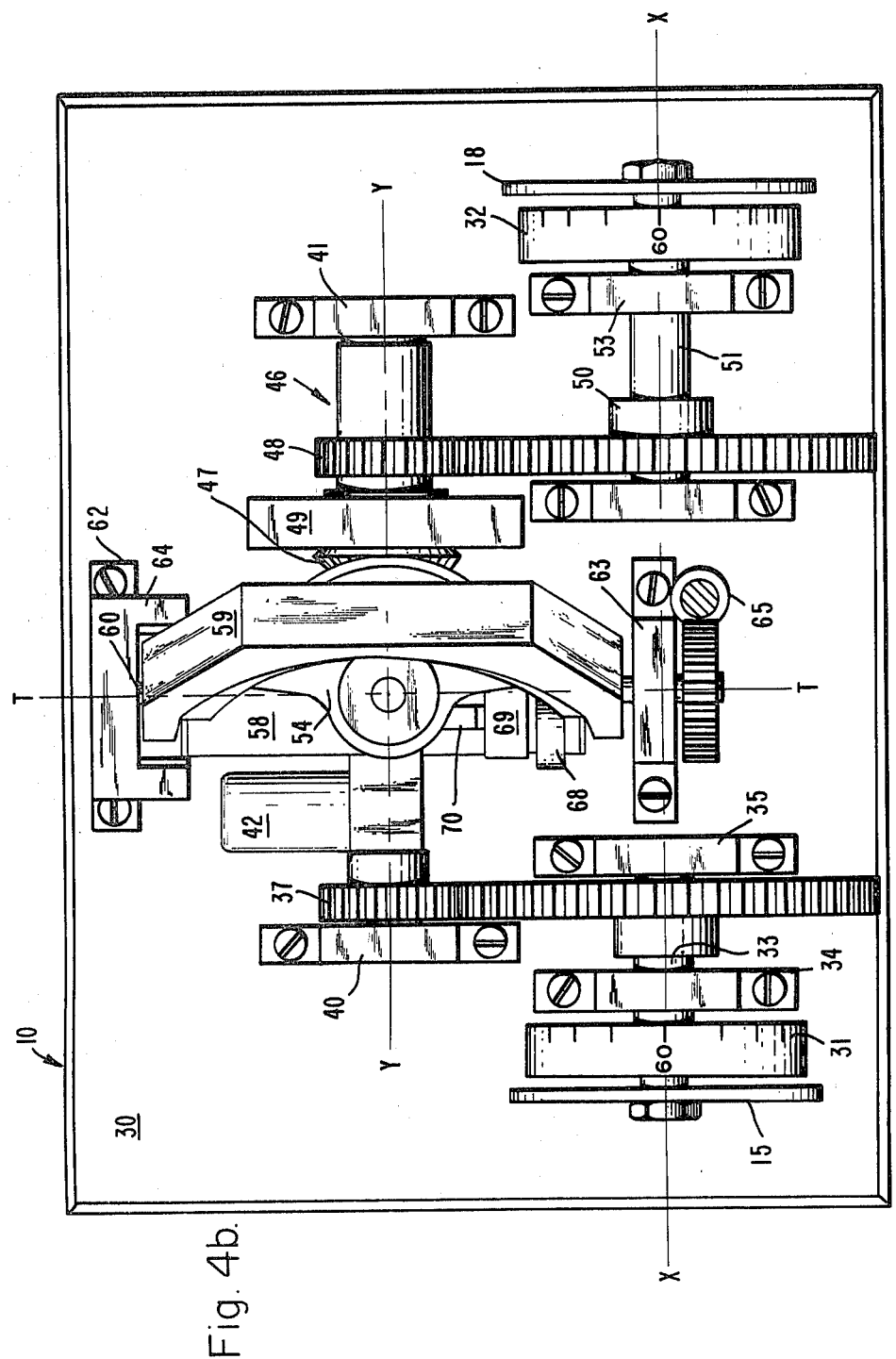
FIG. 4b is a plan view of the device of FIG. 4 with the movable cam in the first trimming position.

The full forward thrust configuration of throttle linkage control 10 is depicted in FIGS. 4, 4a, and 4b. Rotation of throttle lever 12 from the midstroke stroke (FIG. 3) to the full forward thrust position i.e. 60°, causes rotation of input spur gear and pinion, 36 and 37, axle 38, carrier assembly 39, yoke assembly 70 and cam follower 68. Planet gear 54 is revolved about axis Y-Y into the position shown and the cam followers 68 move across and eventually off of, the movable cam race 71 to the fixed cam race 72. Engagement of planet gear 54 with sun gear 47 causes a corresponding rotation thereof and through output spur gear and pinion, 50 and 48 and output axle 51, demands maximum fuel flow to the engine.

With the cam followers, thus in contact with fixed cam portion 58, an up or downtrim command, as illustrated in FIG. 4b has no effect upon output. This again is the result of the fact that while movable cam portion 59 is rotatable about axis T-T, from its centered upright position (FIGS. 4 and 4a), such rotation cannot affect cam followers 68 because of their position, and thus planet gear 54 does not rotate about axis R-R (FIG. 6) to demand a fuel flow rate which differs from that commanded by the throttle lever 12, position. Thus, when the throttle lever 12 is in full forward thrust, the input dial reads 60° and despite trim input induced rotation of movable cam 59, about axis T-T (FIG. 4b), output dial 32, also reads 60°, or full forward thrust.

Referring now to FIGS. 5 and 5a and comparing to FIGS. 2 and 2a for discussion of reverse thrust operation, it is seen that pulling the throttle lever 12, back from the 0°, engine idle position, to the mid-reverse thrust position, minus 30° (330° dial reading) rotates input spur gear and pinion, 36 and 37, axle 38, carrier 39, and yoke assembly 70, about axis Y-Y. Planet gear 54 is revolved about axis Y-Y and because of its engagement with sun gear 47 causes rotation of output spur gear and pinion, 50 and 48, output axle 51, and output cable quadrant 18. Matching readings will be obtained on both input and output dials 31 and 32, at all times since cam followers 68 are in contact with fixed cam portion 58, and thus remain unaffected by trim input induced rotation (not shown in drawings) of movable cam element 59.

As described herein the throttle linkage control 10 of the present invention contemplates approximately 180° of cam follower 68 rotation about axis Y-Y in response to 60° of forward thrust rotation of throttle lever 12. Cam followers 68 are in contact with movable cam portion 59 during nearly all of the forward thrust positions except engine idle (0°) or full forward thrust (60°) i.e. when axes R-R and T-T are coincident. The remaining 180° of cam follower 68 rotation is dedicated to reverse thrust operations and locates cam followers 68, in contact with only fixed cam portion 58.

Axes Y-Y, T-T, G-G, and R-R, share a common point in space at all times. This arrangement allows for compact reliable construction and ease of repair.

It should be readily apparent that through proper selection of additional input and output gearing, and lever assembly 22 (FIG. 1) the amount of cam follower 68 reverse thrust rotation can be substantially decreased. This allows for substantially more than 180° of forward thrust rotation of cam followers 68, and thus a wider band of positions near engine idle and full forward thrust, where trim inputs will not affect output.

Figure 9:
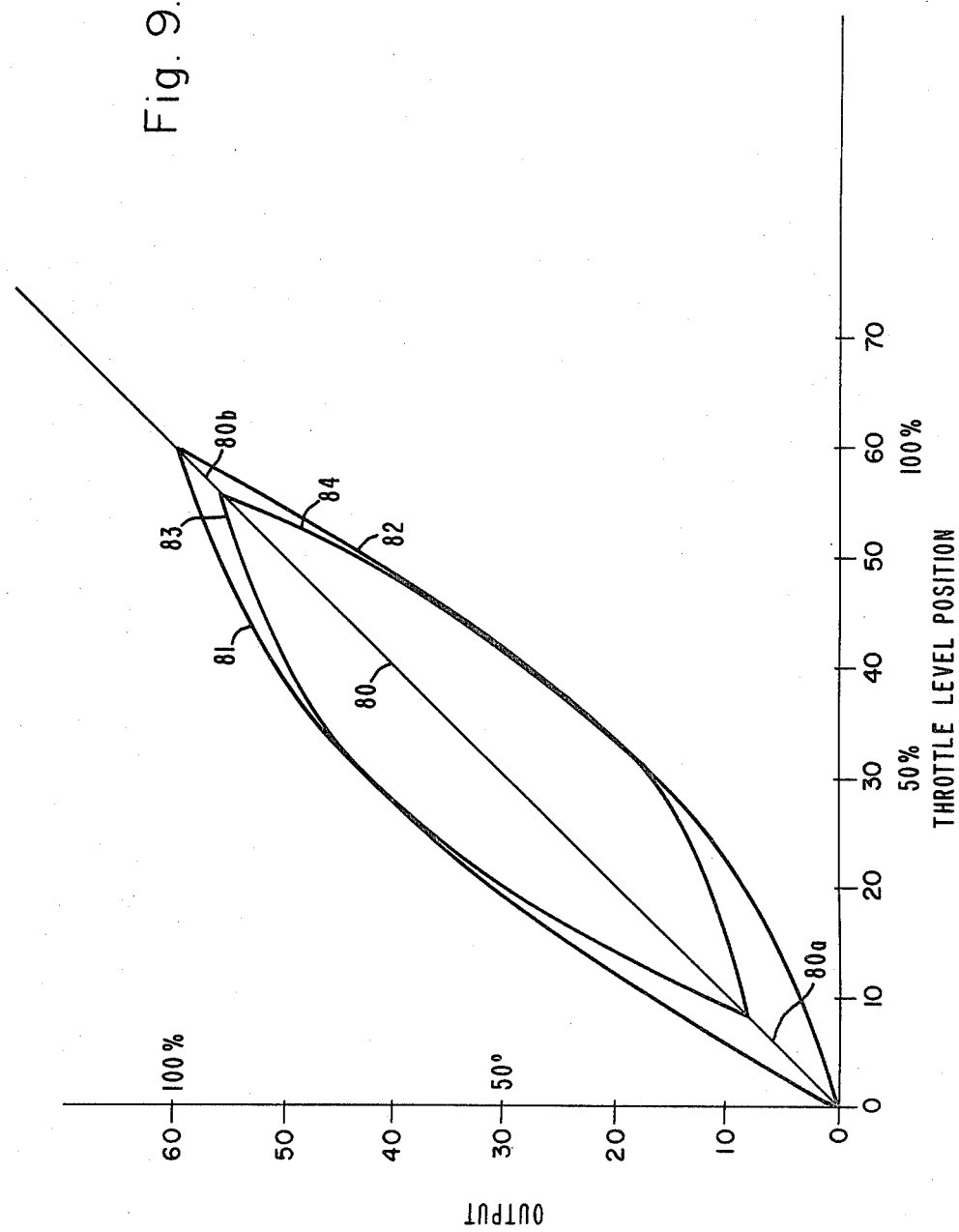
FIG. 9 is a graph showing operational relationships for the devices of the present invention.

FIG. 9 is a graph of the forward thrust output of a throttle linkage control according to the present invention, for given throttle lever 12 positions. The line 80 depicts output for a given throttle lever 12 setting in the absence of trim inputs through movable cam 59. The curve 81, depicts the maximum output for a given throttle lever 12 setting when combined with uptrim inputs. Curve 82, depicts the minimum output for a given throttle lever setting when combined with downtrim inputs. Clearly, any output between curves 81 and 82 may be achieved through the use of the present invention dependent only upon the throttle lever 12 position and the amount of trim input. This graph is generated by the simple cam arrangement, illustrated in the drawings. Clearly, more complex contouring of movable cam portion 59, would result in a different set of curves 81, 82 and straight line 80.

Alteration of the device 10, to allow for more forward thrust rotation of cam followers 68, onto fixed cam portion 58, at the upper and lower extremes of throttle lever 12 input would generate output boundaries as shown by line 80 and curves 83 and 84. Line portions 80a and 80b represent the extended portions of throttle lever 12, forward thrust stroke, during which cam followers 68 are in contact with fixed cam 58, and thus remain unaffected by movement of movable cam portion 59, about axis T-T.

Similarly, standard anti-backlash measures may be employed with the present invention to eliminate system hysteresis. Ideally, the throttle linkage control 10, is located as near to the engine as possible, to further eliminate system hysteresis and improve fuel economy.

Figure 10:
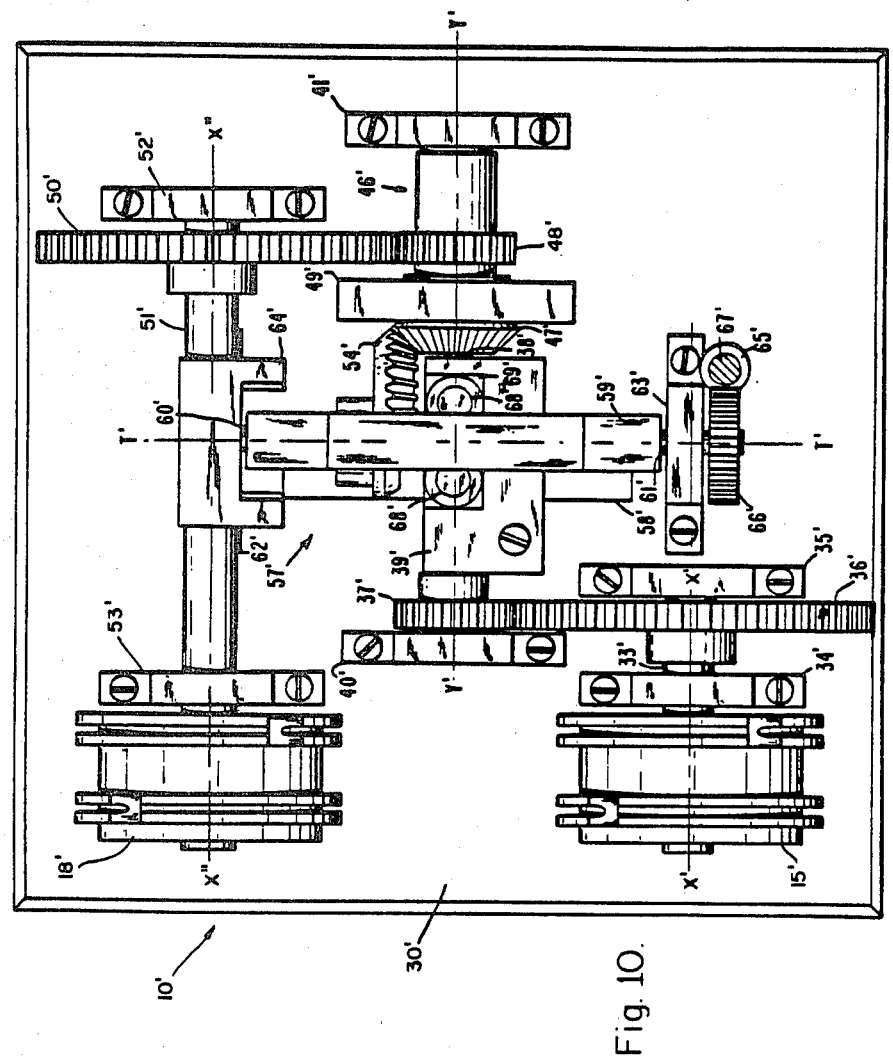
FIG. 10 is a plan view of a version of the throttle linkage control according to the present invention.

In FIG. 10 a slightly modified version of a device 10' according to the present invention is illustrated which is identical in operation to the device of FIGS. 1-8, but in which the location of the output axle 51' and its cooperating elements are transposed so as to be associated with output axis x"-x". In this version of the device only the input members are associated with input axis x'-x'. It should be noted, however, that axes x'-x' and x"-x" are parallel even though they are not coincident and in flanking relation to axis y'-y'. In this manner, it is possible to align input and output cable quadrants 15' and 18' respectively as shown. Thus a device 10' according to the present invention (in which all elements common to the device 10, FIGS. 1-8, of the present invention, are indicated by identical reference numerals and a prime identification to indicate a modified version) is particularly adapted to retrofitting of existing aircraft in which it is desirable to simply cut the cables 13, resplice them and insert a throttle linkage control 10', without having to displace the cable 13 axially along either axes x'-x' or x"-x", from its original location.

I claim:

1. A throttle linkage control for use in a system for controlling the flow of fuel from a source thereof to an engine comprising:

throttle input means rotatable about a throttle axis in response to a preferred fuel flow rate command;

trim input means rotatable about a trim axis in response to a trimming fuel flow rate command for altering said preferred fuel flow rate command;

planet gear means operably associated with said throttle input means and trim input means, said planet gear means being revolvable about a central axis in response to rotation of said throttle input means, and rotatable about a planet axis in response to rotation of said trim input means;

rotatable sun gear mixer means operably associated with said planet gear means and rotatable about a mixer axis in response to revolution or rotation of said planet gear, for combining said preferred and trimming fuel flow rate commands into a single resultant fuel flow rate output command;

rotatable output means, operably associated with said mixer means and the engine, said output means rotatable about an output axis for transmitting said resultant output command to the engine;

fixed cam means for neutralizing the effects of said trimming command upon said resultant output command when said preferred fuel flow rate command is in selected value ranges; and movable cam means rotatable about said trim axis to modify the effects of said altering command upon said resultant output command when said preferred fuel flow rate command is in selected value ranges.

2. The device of claim 1, wherein said throttle input means includes: a rotatable throttle input axle and spur gear assembly.

3. The device of claim 1, and in addition carrier block means, including a central axle, rotatable about said central axis to revolve said planet gear about said central axis in response to rotation of said throttle input means, and wherein said planet gear means includes planet yoke assembly means journaled to said carrier block means for rotation about said planet axis.

4. The device of claim 3, wherein said central axle includes throttle input spur pinion means secured thereto for rotation therewith.

5. The device of claim 4, wherein said throttle input means includes: a rotatable throttle axle, and spur gear affixed thereto for rotation therewith, said throttle input spur gear being in constant toothed engagement with said throttle input spur pinion for complimentary rotation therewith.

6. The device of claim 1, wherein said movable cam means rotates about said trim axis in response to rotation of said trim input means; and said planet gear means includes cam follower means operably associated therewith and with said movable cam means when the preferred fuel flow rate command is in selected value ranges, to allow said planet gear means to rotate about said planet axis in response to rotation of said movable cam means and to revolve about said central axis in response to rotation of said throttle input means.

7. The device of claim 6, wherein said cam follower means may be revolved about said central axis, in response to rotation of said throttle input means, to contact either said fixed or movable cam means.

8. The device of claim 3, wherein said planet yoke assembly means includes a gimbal block secured thereto for revolution about said planet axis with rotation of said planet yoke assembly means thereabout, said gimbal block including cam follower means spaced a fixed distance from said planet axis for contacting either said fixed or movable cam portions.

9. The device of claim 8, wherein said movable cam means rotates about said trim axis in response to rotation of said trim input means; said cam follower means being in contact with said movable cam means and revolvable about said planet axis with rotation of said movable cam means about said trim axis to correspondingly rotate said planet gear means about said planet axis when said preferred fuel flow rate command is in selected value ranges.

10. The device of claim 9, wherein said cam follower means may be revolved about said central axis, in response to rotation of said throttle input means, to contact either said fixed or movable cam means.

11. The device of claim 10, wherein said movable and fixed cam means include cam follower race means for confining contact with said cam follower means to maintain said cam follower means in contact with either said fixed or movable cam means.

12. The device of claim 11, wherein said fixed and movable cam means are in juxtaposed relationship to provide a continuous path for revolution of said cam follower means about said central axis; and said gimbal block may be rotated about a gimbal axis to prevent binding when said cam follower means are revolved from either the fixed or movable cam means to the other.

13. The device of claim 12, wherein said central and trim axes are perpendicular; and said central, trim and planet axes intersect at a common point.

14. The device of claim 13, wherein a given trimming fuel flow command has an increasingly greater effect upon the resultant output command when the cam follower means is in contact with the movable cam means and approaches its greatest distance from said trim axis.

15. The device of claim 11, wherein said carrier block is affixed for rotation to a central axle, said central axle being rotatable about said central axis and including throttle input spur pinion means secured thereto for rotation therewith.

16. The device of claim 15, wherein said throttle input means includes: a rotatable throttle axle, and spur gear affixed thereto for rotation therewith, said throttle input spur gear begin in constant toothed engagement with said throttle input spur pinion for complimentary rotation therewith; and said fixed and movable cam means being in juxtaposed relationship to provide a continuous path for revolution of said cam follower means about said central axis; said gimbal block being rotatable about a gimbal axis to prevent binding when said cam follower means is revolved from either the fixed or movable cam means to the other.

17. The device of claim 16 wherein said fixed and movable cam means include generally symmetrical voids distributed about said central axis and along said trim axis respectively; and said carrier block means, planet yoke assembly means, gimbal block, and planet gear means are suspended in said voids.

18. The device of claim 17, wherein said voids are generally semi-circular and said fixed and movable cam follower races border said voids.

19. The device of claim 7 or 17, wherein a given trimming fuel flow rate command has an increasingly greater effect upon the resultant output command when the cam follower means is in contact with the movable cam means and approaches its greatest distance from said trim axis.

20. The device of claim 19, and in addition, a mixer axle having output spur pinion means rigidly affixed thereto for rotation therewith about said mixer axis, said rotatable sun gear means being mounted upon said mixer axle for rotation therewith.

21. The device of claim 20, wherein said rotatable output means includes an output spur gear and axle assembly rotatable about said output axis; said output spur gear being in constant toothed engagement with said output spur pinion.

22. The device of claims 7, 17, or 14, wherein said throttle linkage control is used in a vehicle having a throttle lever movable through a limited stroke defining a plurality of forward thrust positions including: engine idle, half and full forward thrust; and said throttle lever being movable through a plurality of reverse thrust positions, wherein:
said throttle lever is operably associated with said throttle input means to convey said preferred fuel flow rate command to said throttle linkage control to thereby revolve said cam follower means about said central axis, and into contact with said fixed cam means when said throttle lever is in a reverse throttle position or near full forward thrust, or engine idle positions to thereby neutralize the effects of trimming fuel flow rate commands upon resultant output commands; and into contact with said movable cam means at its point of greatest distance from said trim axis when said throttle lever is in a half forward thrust position to maximize the effects of trimming fuel flow rate commands upon resultant output commands.

23. The device of claim 1, said input and output axes being parallel to each other and in flanking relationship to said mixer axis.

24. The device of claim 23 including: input and output cable quadrant means rotatable with said throttle input and output means respectively, oriented in generally flanking relationship to said mixer axis, for association with a throttle lever and the engine respectively.

25. A throttle linkage control for use on an aircraft for controlling the flow of fuel from a fuel source aboard the aircraft to an aircraft mounted engine wherein the aircraft includes a throttle lever movable through a limited stroke defining a plurality of positions corresponding to a preferred fuel flow rate command for controlling engine conditions, comprising:
throttle input means operably associated with said throttle lever and including: a throttle input axle and spur gear assembly rotatable about a throttle axis in response to movement of said throttle lever to a preferred fuel flow rate command position;
trim input means rotatable about a trim axis in response to a trimming fuel flow rate command for altering said fuel flow rate command from that demanded by the position of said throttle lever;
planet gear means operably associated with said throttle input means and trim input means, said planet gear means being revolvable about a central axis in response to rotation of said throttle input means, and rotatable about a planet axis in response to rotation of said trim input means;

rotatable sun gear and mixer axle means operably associated with said planet gear means and rotatable about a mixer axis in response to rotation or revolution of said planet gear means for combining said preferred and trimming fuel flow rate commands into a single resultant output command;

output means operably associated with said engine and said mixer axle means and rotatable about an output axis in response to rotation of said mixer axle for conveying said resultant fuel flow rate command to said engine;

fixed cam means for neutralizing the effects of said trimming fuel flow rate command upon said resultant output command when said preferred fuel flow rate command is near engine idle or full forward thrust and in reverse thrust positions;

movable cam means for modifying the effects of said trimming fuel flow rate command upon said resultant output command when said preferred fuel flow rate command is in selected ranges of forward thrust positions, allowing maximum trim input effect upon resultant output command when said throttle lever commands half forward thrust.

26. The device of claims 1, 7, 17, or 18, wherein said central, and trim axes are perpendicular; and said central, trim and planet axes intersect at a common point.

27. The device of claim 26, wherein said rotatable sun gear mixer means is mounted upon a mixer axle having output spur pinion means rigidly affixed thereto for rotation therewith about said mixer axis.

28. The device of claim 26, wherein said rotatable output means includes an output spur gear and axle assembly rotatable about said output axis; said output spur gear being in constant toothed engagement with said output spur pinion.

29. The device of claim 1 or 25, wherein said trim, central and planet axes intersect at a common point.

30. The device of claims 1, 7, 17, 25, 13, or 14, wherein said throttle linkage control includes stop means for limiting rotation of said movable cam means about said trim axis.

31. A throttle linkage control for controlling the flow of fuel from a source thereof to an engine for use in a fuel control system having a throttle lever movable through a limited stroke defining a plurality of positions corresponding to a preferred fuel flow rate command including engine idle, half and full forward thrust, and reverse thrust, comprising:

throttle input means operably associated with said throttle lever and including: a throttle input axle and spur gear assembly rotatable about a throttle axis in response to movement of said throttle lever to a preferred fuel flow rate command position, said throttle input axle and spur gear assembly suitably journaled for said rotation by support means;

trim input means rotatable about a trim axis in response to a trimming fuel flow rate command for altering said fuel flow rate command from that demanded by the position of said throttle lever including: gear means for rotating in response to rotation of a worm gear, said worm gear rotatable about a worm axis in response to said trimming fuel flow rate command;

a central axle supported by support means for rotation about a central axis in response to rotation of said throttle input axle and spur gear assembly, said central axle including: input spur pinion means operably associated therewith for rotation therewith, said input spur pinion being in constant toothed engagement with said input spur gear for complimentary rotation therewith; and carrier block means affixed to said central axle for rotation therewith, said central axis being perpendicular to said trim axis;

planet gear means rigidly affixed to a planet yoke assembly, said planet yoke assembly being journaled to said carrier block for rotation with said planet gear means about a planet axis in response to rotation of said trim input means and revolvable with said planet gear means about a central axis in response to rotation thereof;

interconnected rotatable sun gear and mixer axle means supported for rotation about a mixer axis by support means for combining said preferred and trimming fuel flow rate commands into a single resultant output command, said sun gear means being in constant toothed engagement with said planet gear means to rotate about said mixer axis in response to rotation or revolution of said planet gear means, said mixer axle including output spur pinion means rotatable therewith and said mixer axis being coincident with said central axis;

output means operably associated with the engine and rotatable about an output axis in response to rotation of said mixer axle for conveying said resultant fuel flow rate command to the engine, including: output spur gear and axle means supported for rotation by support means, said output spur gear means being in constant toothed engagement with said output spur pinion means for complimentary rotation therewith;

fixed cam means for neutralizing the effects of said trimming fuel flow rate command upon said resultant output command when said preferred fuel flow rate command is near engine idle or full forward thrust and reverse thrust positions, said fixed cam means including: fixed cam race means generally symmetrically distributed about said central axis and bordering a generally semi-circular void distributed about said central axis, said fixed cam means including beveled edges near its ends;

movable cam means for modifying the effects of said trimming fuel flow rate command upon said resultant output command when said preferred fuel flow rate command is in selected ranges of forward thrust positions, allowing maximum trim input effect upon resultant output command when said throttle lever commands half forward thrust, including: a movable cam plate secured to said trim means gear and supported for rotation therewith about said trim axis by support means, said movable cam plate including movable race means movable with said cam plate, and bordering a movable cam plate void, said movable cam plate void being contiguously distributed along said trim axis in a semi-circular form, said planet gear means, planet yoke assembly carrier block and central axle being suspended by said support means in said fixed and movable cam means voids, said movable cam plate including depending skirt means for fitting over the ends of said fixed means to align said trim axis with the leading edge of said fixed cam means to cooperate with said beveled edges of said fixed cam means to allow generally interference free limited rotation of said movable cam plate about said trim axis;

stop means operably associated with said movable cam plate to limit rotation thereof about said trim axis; and gimbal block means rotatable about a gimbal axis and secured to said planet yoke assembly for revolution about said central and planet axes, said gimbal block including cam follower means spaced a fixed distance from said central axis to ride in said fixed and movable cam means races, said gimbal axis being perpendicular to said planet axes and intersecting said central axis at a common point with said trim and planet axes, wherein a given movement of said movable cam means in response to said trimming fuel flow rate command causes a greater effect upon said resultant output command when said cam follower means is in contact with said movable cam means race, and, said cam follower means approaches its greatest distance in said movable cam means race from said trim axis, said cam follower means reaching said greatest distance from said trim axis when said throttle lever demands half forward thrust, thereby placing said gimbal axis in a perpendicular orientation to said trim axis.

32. A throttle linkage control for use in a system for controlling the flow of fuel from a source thereof to an engine comprising:

throttle input means rotatable about a throttle axis in response to a preferred fuel flow rate command;

trim input means rotatable about a trim axis in response to a trimming fuel flow rate command for altering said preferred fuel flow rate command;

planet gear means operably associated with said throttle input means and trim input means, said planet gear means being revolvable about a central axis in response to rotation of said throttle input means, and rotatable about a planet axis in response to rotation of said trim input means;

rotatable sun gear mixer means operably associated with said planet gear means and rotatable about a mixer axis in response to revolution or rotation of said planet gear, for combining said preferred and trimming fuel flow rate commands into a single resultant fuel flow rate output command;

rotatable output means, operably associated with said mixer means and the engine, said output means rotatable about an output axis for transmitting said resultant output command to the engine;

fixed cam means for neutralizing the effects of said trimming command upon said resultant output command when said preferred fuel flow rate command is in selected critical value ranges; and movable cam means rotatable about said trim axis to modify the effects of said altering trim command upon said resultant output command when said preferred fuel flow rate command is in other selected value ranges.

* * * * *